United States Patent [19]

Miyazaki et al.

[11] Patent Number: 4,787,141
[45] Date of Patent: Nov. 29, 1988

[54] AUTOMATIC ASSEMBLING APPARATUS

[75] Inventors: Hiroshi Miyazaki; Takao Miyatani; Akira Ishizaki, all of Toyota, Japan

[73] Assignee: Toyota Jidosha Kabushiki Kaisha, Japan

[21] Appl. No.: 63,919

[22] Filed: Jun. 19, 1987

[30] Foreign Application Priority Data

Jul. 18, 1986 [JP] Japan ............... 61-110395[U]

[51] Int. Cl.$^4$ .................................... B23P 19/04
[52] U.S. Cl. ........................ 29/795; 29/783; 29/784; 29/787; 29/799; 29/823; 901/1
[58] Field of Search ............... 29/795, 799, 783, 784, 29/785, 786, 787, 791, 822, 823, 824; 901/1, 14, 16, 50, 41, 42, 43; 248/676, 678, 679, 657, 424, 429

[56] References Cited

U.S. PATENT DOCUMENTS 4,177,002 12/1979 Motoda et al. ............ 901/14 X
4,673,075 6/1987 Ueyama et al. .......... 29/799 X
4,674,181 6/1987 Hamada et al. .......... 29/799 X Primary Examiner—P. W. Echols
Assistant Examiner—Joseph M. Gorski
Attorney, Agent, or Firm—Finnegan, Henderson, Farabow, Garrett and Dunner

[57] ABSTRACT

An automatic assembly apparatus for fastening a part to a workpiece includes a pair of T-shaped legs, each having a horizontal guide thereon, mounted on a base in alignment with and spaced from each other in the direction of the path of the workpiece while the horizontal guide on each of the T-shaped legs extends at right angles to and intersects the path of the workpiece. A horizontal orthogonal coordinate type robot is mounted on the horizontal guides to move in the direction of the path of the workpiece while being simultaneously movable at right angles to and intersecting the path of the workpiece. A conveyor jig is mounted on each of the vertical structures between the base and the T-shaped legs.

7 Claims, 2 Drawing Sheets

FIG. 1
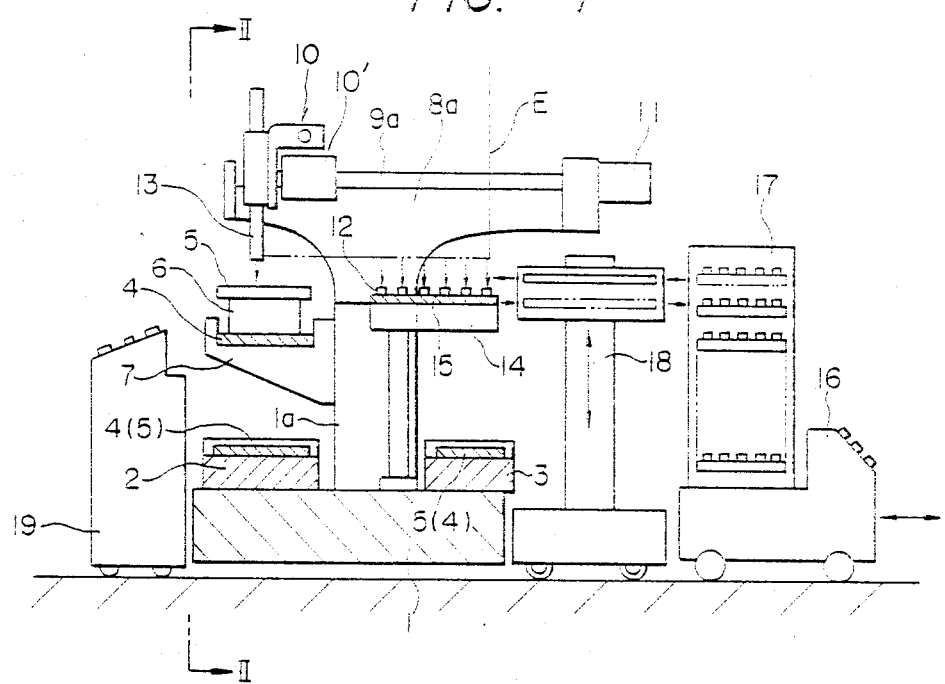
FIG. 2
FIG. 3
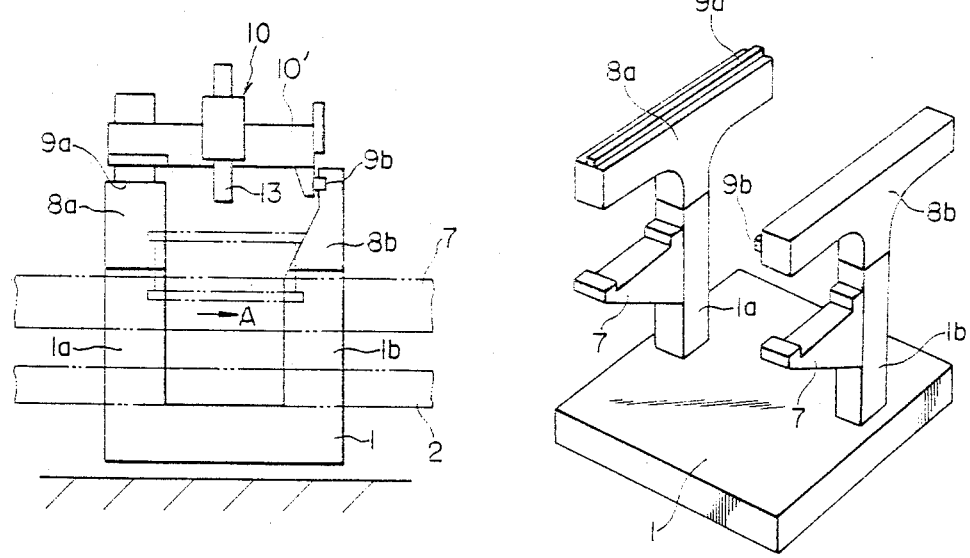

AUTOMATIC ASSEMBLING APPARATUS

BACKGROUND OF THE INVENTION

The present invention relates to an automatic assembly apparatus, and more particularly to an automatic assembly apparatus of the type installed in a product assembly line of a manufacturing plant for assembling parts of a workpiece.

Typically, a number of individual stations are installed in a production line of an assembly plant for each step in the automatic assembly of automobile parts, such as engine cylinder blocks: Referring to FIG. 5, a large vertical column, such as 32 is erected for one or more stations, for performing the assembly operation with an assembling shaft head 33 of column 32. In assembling a part to a workpiece 34 at the assembling shaft head 33, it is necessary to supply or convey such part to the workpiece in a roundabout manner so as to avoid the column 32, which is positioned approximately in the center of assembly station 31. Such part is generally supplied along a course that deviates upwardly or sidewardly from the column 32.

Further, the above-mentioned conventional technique incorporates a system of installing an individual apparatus 31 for each station of the assembly line; and therefore, whenever it is required to change the station or to add a further station due to a change in the work or the addition of new work, all of the apparatus assigned to the station must be changed. Thus, the station changing or adding operation becomes quite complicated.

Further, since the parts assembled at each station are supplied in a roundabout manner to avoid the column 32 or the assembling shaft head 33 mounted thereon, the entire facility, which includes the incidental equipment such as the work carrying means, work pallet collecting means, control means and etc., has become complicated, thereby hindering the visibility of the assembly work in the production line.

Recently, a flexible system in which an articulated robot is provided at each station of the assembly line has been developed, for the assembly of small-sized workpieces, such as electronic parts, home electrical appliances and etc., but the articulated assembling robot has a wide operating range so that without a safety fence or the like arrangement, it is difficult for an operator to intuitively be aware of the operation range; and moreover, he cannot but feel some sense of difficulty while he works with the robot. Further, since the robot has an arm held in a cantileaver fashion, it is not suitable for handling heavy parts; although it is applicable to the handling of those parts that are of light weight.

SUMMARY OF THE INVENTION

One object of the present invention is to overcome the above-described technical difficulties.

Another object of the present invention is to provide the widest possible space for facilitating the direct transfer or supply of parts to the assembly tool, and the transfer of auxiliary equipment such as pallets.

A further object of the present invention is to provide a BBS (building block) type automatic assembling apparatus capable of handling changes to the stations or the addition of stations, and yet is of simple structure with the minimum operating space, while affording the robot operator the least sense of difficulty, while he works with the robot.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

According to the present invention, a horizontal orthogonal coordinate type assembling robot is installed on a stereo-portal support mechanism instead of providing an individual apparatus for each station so that it is applicable to medium- and large-sized workpieces.

To achieve the objects and in accordance with the purpose of the invention, as embodied and broadly described herein, the automatic assembly apparatus of the present invention for fastening parts to a workpiece, which workpiece is movable along a path, comprises a base; a pair of spaced vertically extending columns mounted on the base, the columns being spaced from each other in the direction of the path of the workpiece. A pair of T-shaped legs are disposed adjacent a respective upper end of each said column, each of the legs extend substantially transverse to the direction of the workpiece path. A pair of guides mounted on the respective T-shaped legs extend at right angles to and intersect the path of the workpiece; and a horizontal orthogonal coordinate type assembling robot having an elongated supporting member fastened at opposite ends to the pair of guides bridge the pair of columns, the elongated member being capable of reciprocating along the guides, and the robot being capable of reciprocating along the elongate member.

The accompanying drawings, which are incorporated in and constitute a part of this specification, illustrate one embodiment of the invention, and together with the description, serve to explain the principles of the invention.

BRIEF DESCRIPTION OF THE DRAWINGS

FIG. 1 is a side view, partially in section, and looking in the direction of the path of the assembly line, of one embodiment of an automatic assembly apparatus according to the present invention;

FIG. 2 is a schematic front view of the automatic assembly apparatus taken along line II—II of FIG. 1;

FIG. 3 is a perspective view of the spaced column structures of the assembly apparatus shown in FIG. 1:

DETAILED DESCRIPTION OF THE PREFERRED EMBODIMENTS

Figure 4:
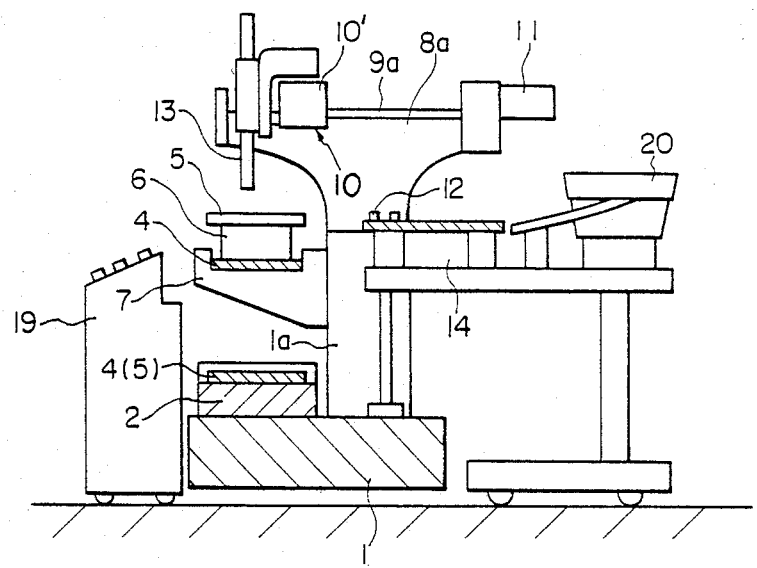
FIG. 4 is a side view similar to FIG. 1 of another embodiment of the automatic assembly apparatus of the present invention.
Figure 5:
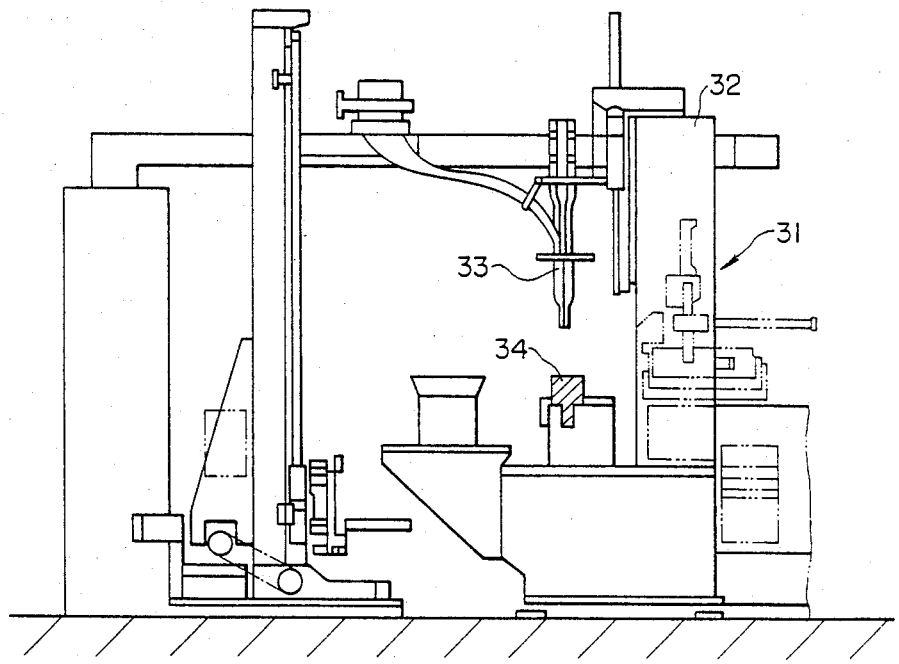
FIG. 5 is a schematic side view of an automatic assembly apparatus according to a technique prior to the present invention

The preferred embodiments of the present invention will now be described with reference to the accompanying drawings. FIG. 1, which is a side view (partially in section) of an automatic assembly apparatus according to the present invention, and wherein FIG. 2, which is a front view taken along II—II line of FIG. 1 illustrates a base designated as reference numeral 1 provided at each of the stations arranged along an assembly line. On the base 1, there are erected a pair of columns 1a and 1b aligned with each other and spaced from each other in direction A of the path or course of the workpiece. The base 1 and the pair of columns 1a and 1b which are erected on base 1 are substantially in the shape of a U when viewed as a whole from the front of the assembly line, as shown in FIG. 2; and each of the columns 1a and 1b are individually in the shape of a T when viewed in FIG. 1. On the upper surface of the base 1 there is arranged a pallet supply/collecting device 2/3 on either sides of the column 1a. The pallet supply/collecting device 2 is adapted to supply /collect a work pallet 4 or a temporary pallet 5; and the collecting/supply device 3 is adapted to collect/supply the pallet 5 or the work pallet 4. A conveyor jig 7 is attached on one side surface of each of the columns 1a and 1b facing the pallet supply device 2. Conveyor jigs 7, are provided for supporting a conveyor for conveying and positioning a workpiece 6 with the work pallet 4. A temporary pallet 5 is placed on the workpiece 6. The temporary pallet 5 is used to convey, together with workpiece 6, a part that is required to be removed temporarily midway through the assembly in order to assemble another part with the workpiece.

Designated by reference numerals 8a and 8b are T-legs mounted on respective columns 1a and 1b, which in turn are mounted on the base 1. On the surface of the respective T-legs 8a and 8b are provided a pair of substantially horizontal guides 9a and 9b which extend at right angles to the direction A of the workpiece carrying path. Horizontally extending guide rail 9a is mounted on a horizontally extending plane surface of T-leg 8a; and guide rail 9b is mounted on a vertically extending plane surface of T-leg 8b. Further, an orthogonal coordinate type assembling robot 10, is mounted on and bridges the T-legs 8a and 8b.

The assembling robot 10 includes an elongate member 10' that engages, adjacent opposite ends thereof, the horizontal guides 9a and 9b; and is movable along a path that extends at right angles to the direction A of the path of the workpiece. A conventional drive means 11 for moving the assembling robot 10 along the horizontal guides 9a and 9b in a direction transverse to the direction A is arranged at the extreme end of the horizontal spaced guide 9a. A similar conventional drive member (not shown) is provided for moving the robot on elongate member 10' in the direction A. An assembling head 13 is attached to the assembling robot 10, which moves vertically for fastening a part, such as 12 to the work workpiece 6. This assembling head 13 may be a conventional nut runner, for example.

Reference numeral 14 designates a positioning section disposed between the pair of T-legs 8a and 8b and determines the position of a matrix tray 15 for holding assembly parts. Reference numeral 16 designates a conventional container carriage for conveying a tray container 17 to each station. A tray in the tray container 17 is conveyed to the positioning section 14 in exchange for an empty tray by a tray changer 18.

Reference numeral 19 designates a movable control panel, which may be arranged along side the base 1 (the left side in FIG. 1). The control panel 19, which is small in height and thickness, in the present invention, controls the operation of pallet supply/collecting device 2, pallet collecting/supply device 3 and assembling robot 10.

With the above structure, when the part 12 is to be fastened to the workpiece 6, for example, the assembling robot 10 is moved to a position right above the positioning section 14; and the part 12 on the matrix tray 15 is grasped or clamped by the assembling head 13. After that, the assembling robot 10 is moved to an assembling position corresponding to the workpiece 6, and then the assembling head 13 is lowered, thereby assembling the part 12 with workpiece 6.

In the instant embodiment, the operation of the assembling robot 10 is within the range shown by a two-dot chain line E in FIG. 1 and therefore, a manual working zone of a sufficient space is available around the base 1. Further, the control panel 19 can be moved away from the base 1 to a position for facilitating the maintenance and inspection of the automatic assembling apparatus.

The automatic assembling apparatus of the present invention basically comprises the base 1 provided with the columns 1a and 1b, the T-shaped legs 8a and 8b and the assembling robot 10, and various kinds of modularized incidental devices can be removably connected to the apparatus in a simple manner as desired. Accordingly, if a number of such automatic assembly apparatus are arranged in a line at each station of the assembly line, they are able to meet in a flexible manner, any possible change or addition of products, or modification of the line layout, thereby saving capital investment and shortening the time requirements. Further, since the entire structure of the apparatus is extremely compact, the length of the assembly line and the equipment space can be minimized which contributes to improve the visibility of the assembly operations within the plant.

FIG. 4 shows another embodiment of the present invention wherein like parts are designated by like numerals. This embodiment is characterized by an arrangement in which the assembling part 12 is automatically supplied to the positioning section 14 by a vibrating ball part feeder 20.

As described above, according to the present invention, the assembling robot 10 and the required units can be easily removed from, are combined with, the automatic assembling apparatus at each station of the assembly line, so that the apparatus can conform to any change to, or addition of, the station in a flexible manner; and further, despite the fact that a wide space is required around the assembling robot 10, the structure of the apparatus as a whole can be compact.

Further, since the operating range of the assembling robot becomes minimal in the region above the work carrying passage or path, there is no section in which the operation of the robot interferes with the manual working zone. Thus, a wide space can be used for the manual working zone.

The workpieces to be handled by the automatic assembling apparatus of the present invention are medium and large-size, which may also require press-fitting in the assembly process, and include, primarily, engine blocks, transmissions, differential gears, cam-shaft caps, etc.

In summary, the structure of the automatic assembling apparatus of the present invention, includes on the upper ends of the pair of columns 1a and 1b erected on the base 1 the pair of legs 8a and 8b each in the shape of a T when viewed from the direction of the path of the workpiece. Further, below the corresponding upper horizontal portions 8a and 8b of each of the T-leg structures, there is provided a clearance defined between the T-leg structure portion 8a and 8b, and the base 1 for use as a passageway for a workpiece insertion and removal belt conveyor, for example. Moreover, a pair of horizontal guides are mounted on the upper horizontal portions of the T-legs, respectively. In the space between the pair of columns 1a and 1b and the T-legs 8a and 8b, and between the pair of horizontal guides there is provided a bridge-mounted orthogonal coordinate type assembling robot, which moves back and forth in the horizontal direction along the horizontal guides 9a and 9b in a region above a work carrying level. The centering system, which includes elongate member 10' and supports the assembling robot, is supported at two ends by the pair of T-legs; and at the same time both of the support ends are held fixed in the vertical direction so that a press-fitting operation accompanied by a strong reaction force can also be performed by the robot. To perform a screw-fastening operation, it is sufficient to mount a conventional nut runner thereon. A control device for the robot or the like is positioned in front of the base, and in that case, the control device should be relatively small so as to allow it to freely come in contact with, or be moved away from the base for ease of maintenance.

The automatic assembling apparatus according to the present invention is installed at each station in the path of the assembly line. In the embodiments of the present invention, the base and the T-shaped supports are modularized to facilitate the removal and changes of the assembling robot and its auxiliary units, so that the apparatus can conform to changes and addition of stations in a flexible manner.

Further, the present invention allows for the arrangement of pallet carrying and collecting means on the upper surface of the base: and also permits the arrangement of conveyor jigs on one side of the column section, and assembly parts supply means between the pair of T-shaped columns.

Moreover, the operation of the assembling robot is limited within the required range along the horizontal guides while a wide space is provided in the region on the side of the work carrying passage of the base, so as to allow the operator to have a wide range of access to the robot. Consequently, there is no interference area between the robot and the operator on one side of the assembly line; and the operator can work well with the robot.

It will be apparent to those skilled in the art that various modifications and variations can be made in the automated assembly system of the present invention without departing from the spirit or scope of the invention. Thus, it is intended that the present invention cover the modifications and variations of this invention provided they come within the scope of the appended claims and their equivalents.

What is claimed is:

1. An automatic assembly apparatus for fastening parts to a workpiece which is movable along a path, comprising:
   a base;
   a pair of spaced vertically extending columns mounted on said base, said columns being spaced from each other in the direction of the path of the workpiece;
   a pair of T-shaped legs disposed on adjacent upper ends of said columns, each of said legs having a horizontal portion extending substantially transverse to the direction of the workpiece path;
   a pair of guides, each mounted on one of said T-shaped legs extending at right angles to and intersecting the path of the workpiece; and
   a horizontal orthogonal coordinate type assembling robot having an elongated supporting member fastened at opposite ends to said pair of guides for bridging the pair of columns, one of said pair of guides being disposed on the corresponding T-shaped leg to block removal of the member in the vertical direction, said elongated member being capable of reciprocating along said pair of guides, said robot being capable of reciprocating along said elongated member.

2. An automatic assembly apparatus according to claim 1, further comprising a conveyor jig for receiving a workpiece carrying conveyor, said conveyor jig being mounted on one side surface of each of said columns disposed at a position intermediate the base and the horizontal portion of a respective T-shaped leg.

3. An automatic assembling apparatus according to claim 1, further comprising a positioning section between said pair of columns for determining the position of an assembly part matrix tray.

4. An automatic assembly apparatus according to claim 1, further comprising a work pallet supply device and a work pallet collecting device disposed on said base at opposite sides of and aligned with one of said columns in the direction of reciprocation of the robot.

5. An automatic assembly apparatus according to claim 1, wherein the horizontal portion of each of said pair of T-shaped legs has an upper horizontal planar surface and vertical planar surface, and one said of said pair of guides is supported on a vertical surface of one of said pair of T-shaped legs and the other of said pair of guides is supported on the upper horizontal surface of the other of said pair of T-shaped legs.

6. An automatic assembly apparatus according to claim 5, wherein a vertical surface of the other pair of T-shaped legs supporting the other of said pair of guides opposes the vertical surface supporting said one of said pair of guides of the one of the pair of T-shaped legs.

7. An automatic assembly apparatus according to claim 6, wherein each of said pair of guides are substantially rectangular in cross section.

* * * * *